(12) United States Patent
Comstock

(10) Patent No.: US 10,194,363 B2
(45) Date of Patent: Jan. 29, 2019

(54) DYNAMIC RADIO COVERAGE AREA TRANSITION MANAGEMENT

(71) Applicant: Kyocera Corporation, Kyoto (JP)

(72) Inventor: David Comstock, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 370 days.

(21) Appl. No.: 14/781,527

(22) PCT Filed: Apr. 4, 2014

(86) PCT No.: PCT/US2014/033054
§ 371 (c)(1),
(2) Date: Sep. 30, 2015

(87) PCT Pub. No.: WO2014/165809
PCT Pub. Date: Oct. 9, 2014

(65) Prior Publication Data
US 2016/0066236 A1   Mar. 3, 2016

Related U.S. Application Data

(60) Provisional application No. 61/822,203, filed on May 10, 2013, provisional application No. 61/809,177, filed on Apr. 5, 2013.

(51) Int. Cl.
*H04W 16/24* (2009.01)
*H04W 36/16* (2009.01)
(Continued)

(52) U.S. Cl.
CPC ......... *H04W 36/165* (2013.01); *H04W 16/24* (2013.01); *H04W 36/0083* (2013.01);
(Continued)

(58) Field of Classification Search
None
See application file for complete search history.

(56) References Cited

U.S. PATENT DOCUMENTS

| 8,515,410 B1 * | 8/2013 | Bach ................. H04W 52/0206 455/418 |
| 9,642,082 B2 * | 5/2017 | Byun ................. H04W 52/0206 |

(Continued)

FOREIGN PATENT DOCUMENTS

| CN | 102065448 A | 5/2011 |
| EP | 2 056 628 A1 | 5/2009 |

(Continued)

OTHER PUBLICATIONS

CMCC; "TP on LE coverage layer ES solution", R3-132357; 3GPP TSG RAN WG3 Meeting #82, Nov. 11-15, 2013; San Francisco, US.

(Continued)

Primary Examiner — Nicholas Sloms

(57) ABSTRACT

In a cellular communication system, a coverage transition Is performed where a compensation service area is expanded to cover an energy saving service area and the energy saving service area is deactivated The coverage transition is managed by transferring user equipment devices (UE devices) from an energy saving service area to a transition service area that at least partially overlaps with the energy saving service area. The UE devices may be transferred using a handover procedure between communication stations where each UE device is assigned communication frequencies for communication with the transition communication station that are not used by the energy saving communication station or the compensation service area, thereby avoiding, or at least minimizing, interference. After all UE devices are transferred from the energy saving service area, the communication stations are configured to deactivate the energy saving service area and to expand the compensation service area to cover the energy saving service area.

18 Claims, 9 Drawing Sheets

(51) Int. Cl.
*H04W 52/02* (2009.01)
*H04W 36/00* (2009.01)
*H04W 36/08* (2009.01)
*H04W 16/32* (2009.01)
*H04W 88/02* (2009.01)
*H04W 76/28* (2018.01)

(52) U.S. Cl.
CPC ....... *H04W 36/08* (2013.01); *H04W 52/0206* (2013.01); *H04W 52/0209* (2013.01); *H04W 52/0254* (2013.01); *H04W 16/32* (2013.01); *H04W 76/28* (2018.02); *H04W 88/02* (2013.01); *Y02D 70/1262* (2018.01)

(56) References Cited

U.S. PATENT DOCUMENTS

| | | |
|---|---|---|
| 2005/0090263 A1 | 4/2005 | Ebata |
| 2010/0056157 A1 | 3/2010 | Itzhak et al. |
| 2011/0098041 A1 | 4/2011 | Tomita et al. |
| 2011/0158190 A1* | 6/2011 | Kuwahara ............ H04B 7/0617 370/329 |
| 2011/0170466 A1 | 7/2011 | Kwun |
| 2011/0300805 A1* | 12/2011 | Gaikwad ............. H04W 52/244 455/63.1 |
| 2012/0208543 A1 | 8/2012 | Takagi |
| 2013/0021996 A1 | 1/2013 | Wang et al. |
| 2013/0083714 A1 | 4/2013 | Joko et al. |
| 2013/0095842 A1* | 4/2013 | Jia ..................... H04W 28/16 455/452.1 |
| 2013/0252660 A1* | 9/2013 | Bach ................. H04W 52/0206 455/525 |
| 2013/0286917 A1* | 10/2013 | Jia ..................... H04W 52/0206 370/311 |
| 2013/0286919 A1 | 10/2013 | Kawashima |
| 2014/0038598 A1* | 2/2014 | Ren .................... H04W 48/16 455/434 |
| 2014/0051446 A1* | 2/2014 | Rose .................. H04W 36/165 455/436 |
| 2015/0139100 A1* | 5/2015 | Grob-Lipski ....... H04W 88/085 370/329 |
| 2015/0223185 A1* | 8/2015 | Harris ................. G01S 5/0236 455/456.5 |

FOREIGN PATENT DOCUMENTS

| | | |
|---|---|---|
| EP | 2560428 | 2/2013 |
| JP | 2006-352477 | 12/2006 |
| JP | 2012-182713 | 9/2012 |
| JP | 2012-074889 A | 4/2014 |
| KR | 10-2008-0079381 | 9/2008 |
| KR | 10-2010-0094942 | 8/2010 |
| KR | 10-2012-0063840 | 6/2012 |
| WO | WO 2011-046150 A1 | 4/2011 |
| WO | WO 2011/158858 A1 | 12/2011 |
| WO | WO 2012/086621 A1 | 6/2012 |
| WO | WO 2012-093888 | 7/2012 |
| WO | WO 2012-145711 | 10/2012 |
| WO | WO 2012-175362 | 12/2012 |
| WO | WO 2013-049505 | 4/2013 |

OTHER PUBLICATIONS

CMCC; "Update of the TR 37.877 for the Rel.12 ES SI", R3-132461; 3GPP TSG RAN WG3 Meeting #82; Nov. 11-15, 2013; San Francisco, US.

Kyocera; "Non-overlapping coverage scenario considerations for Energy Saving"; R3-130694; 3GPP TSG RAN WG3, Meeting #79bis; Apr. 15-19, 2013; Chicago, IL.

Catt; "The solution for the compensation scenario"; R3-110075; 3GPP TSG RAN WG3#70bis; Jan. 17-21, 2011; Dublin, IE.

ZTE; "Time alignment for compensation mode energy saving"; R3-110153; 3GPP TSG RAN WG3 #70bis; Jan. 17-21, 2011; Dublin, IE.

3rd Generation Partnership Project; "3GPP TS 36.300 V11.5.0"; Mar. 15, 2013; p. 63-67; Valbonne, FR.

New Postcom; "Discussions on Non-Overlapping Inter-eNB Energy Saving Scenario"; R3-121113; 3GPP TSG RAN WG3 Meeting #76; May 21-25, 2012; Prague, Czech Republic.

Catt; "Energy Saving Scenarios for E-UTRAN"; R3-112393; 3GPP TSG-RAN WG3 Meeting #73bis; Oct. 10-14, 2011; Zhuhai, CN.

Catt; "The solution for the compensation scenario"; R3-120103; 3GPP TSG RAN WG3 #75; Feb. 6-10, 2012; Dresden, DE.

* cited by examiner

500

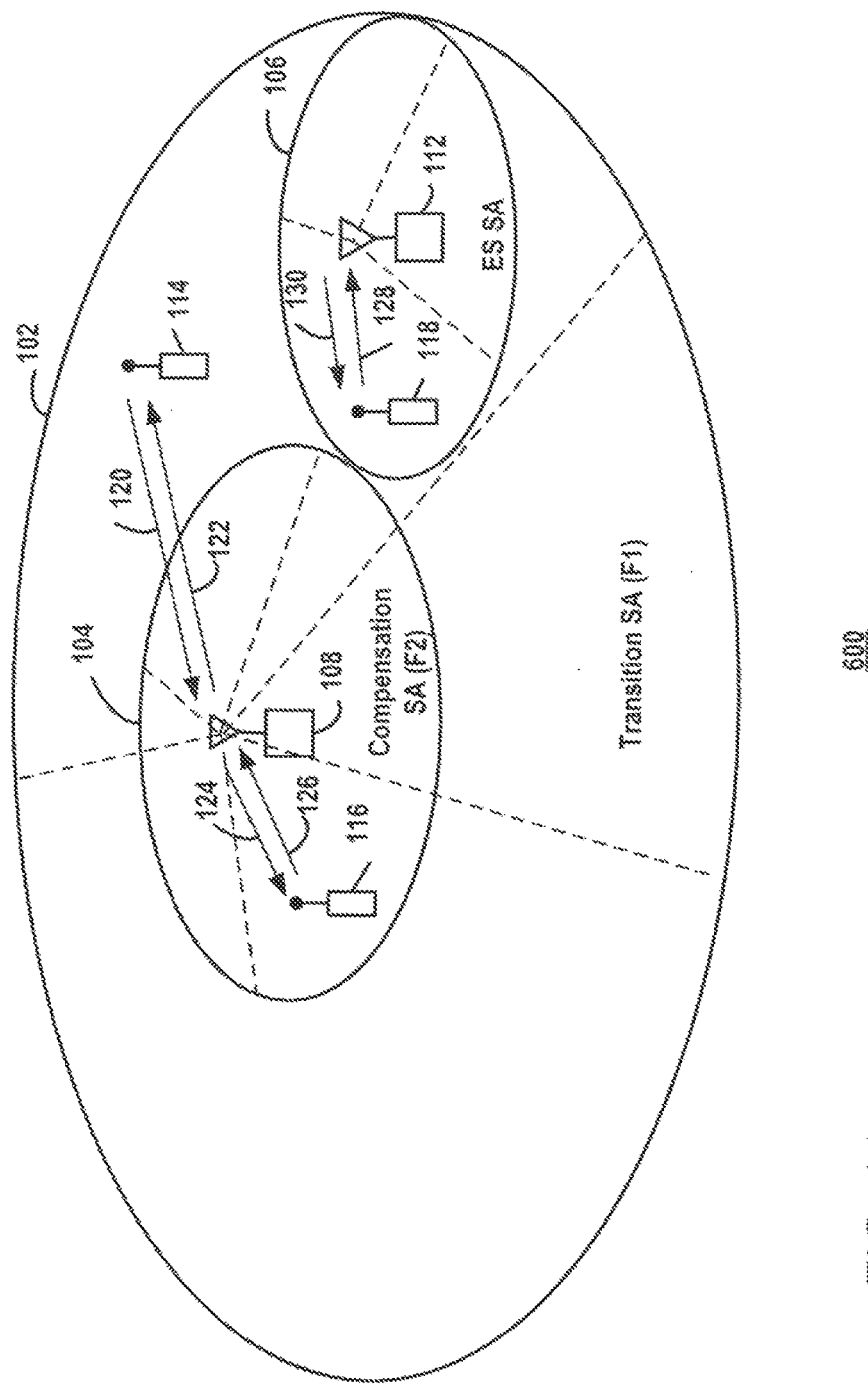

DYNAMIC RADIO COVERAGE AREA TRANSITION MANAGEMENT

PRIORITY

The present application claims priority to U.S. Provisional Application No. 61/809,177, entitled "Methods for Controlling Dynamic Radio Coverage Area Transitions" filed Apr. 5, 2013, and to U.S. Provisional Application No. 61/822,203, entitled "Methods for Managing Transitions Between Cell Coverage Configurations" filed May 10, 2013, assigned to the assignee hereof, and hereby expressly incorporated by reference.

FIELD

This invention generally relates to wireless communications and more particularly to apparatuses, systems, and methods for managing dynamic radio coverage area transitions.

BACKGROUND

Many wireless communication systems employ transceiver stations or radio heads to provide service within geographical service areas, where the boundaries of a service area ere determined by the radio coverage of its associated transceiver station. Wireless service is provided to user equipment (UE) devices within each service area. These service areas are sometimes referred to as "cells". Although the term "cell" sometimes refers to the geographical area where multiple frequencies are used, increasingly the term "cell" is used to refer to the geographical service area where a single uplink resource and downlink resource is used to communicate with the UE devices. For example, where Time Division Duplex (TDD) is used, a single frequency may be used for uplink and downlink at different times within the "cell". Where Frequency Division Duplex (FDD) is used, a single uplink/downlink frequency pair (one uplink frequency and one downlink frequency) is used within a "cell". As discussed herein, one or more frequency resources may be used in a service area. As a result, a service area may be a cell or may contain multiple cells. In one common arrangement, each service area is adjacent to several other service areas to provide ubiquitous coverage over a large geographical area. The service areas may overlap slightly but generally do not provide service within the same geographical area. In many situations, there may be an advantage to dynamically change the configuration of the service areas, such as by selectively reducing the size of some service areas while expanding the size of one or more other service areas to provide service within the area previously serviced by the service areas that were reduced. Such dynamic service area configuration changes may allow for more efficient operation of the system. For example, a service area with only a small umber UE devices may be reduced to zero by deactivating its associated transceivers and an adjacent service area that is serving several UE devices but has available capacity may be expanded to provide radio coverage for the UE devices previously contained in the reduced service area. Therefore, a service area that is reduced may be referred to as an energy saving service area since the energy consumed by its associated transceivers is reduced or eliminated and a service area that is reduced to zero may be referred to as a deactivated service area. A service area that is expanded in cooperation with a service area that is reduced may be referred to as a compensation service area. UE devices being served by an energy saving service area may lose their connection with the network if they are not handed over to another service area before the service area is deactivated. If the energy saving service area and the compensation service area operate on the same frequency resources, UE devices being served by an energy saving service area may lose their connection with the network if the compensation service area is expanded before the UE devices are handed over to another service area because of the interference between the energy saving service area and the compensation service area. As discussed below, management techniques are needed to control the dynamic coverage area configuration transitions.

SUMMARY

In a cellular communication system, a coverage area configuration transition is performed where a compensation communication station is configured to expand a compensation geographical service area (compensation service area) to cover an energy saving geographical service area (energy saving service area) and an energy saving communication station is configured to deactivate the energy saving service area such that the energy saving communication station does not provide wireless service within the energy saving service area. The service area configuration transition is managed by transferring user equipment devices (UE devices) from an energy saving communication station providing wireless service in the energy saving service area to a transition communication station having a transition geographical service area (transition service area) that at least partially overlaps with the energy saving geographical service area. The UE devices may be transferred using a handover procedure where each UE device is assigned communication frequencies for communication with the transition communication station that are not used by the compensation service area, thereby avoiding, or at least minimizing, interference between these UE devices and the compensation service area as it is expanding. After all UE devices are transferred from the energy saving communication station, the energy saving communication station is configured to deactivate the energy saving geographical service area and the compensation communication station is configured to expand the compensation geographical service area to cover the energy saving geographical service area. For this procedure, the compensation communication station and the transition communication station may be the same, such that UE devices may be transferred to the same communication station that provides the compensation service area if this communication station operates frequency resources different than those used by the compensation service area and the energy saving service area and that cover the energy saving service area.

BRIEF DESCRIPTION OF THE DRAWINGS

FIG. 6A is an illustration of coverage areas in a cellular communication system where coverage area transitions are managed using a transition service area provided by the same communication station that provides the compensation service area.

DETAILED DESCRIPTION

Dynamic coverage area configuration transitions are managed using a transition service area that overlaps with the energy saving service area and operates on different frequency resources than the energy saving service area. Prior to expanding the compensation service area, UE devices are transferred from the energy saving communication station providing the energy saving service area to the transition communication station providing the transition service area which uses different communication resources (frequencies) than used by the energy saving service area and the compensation service area. After the UE devices are transferred to the transition communication station, the energy saving communication station is configured to deactivate the energy saving service area and the compensation communication station is configured to expand the compensation service area to cover the region previously serviced by the energy saving communication station in the energy saving service area. At least some of the UE devices previously receiving service from the energy saving communication station in the energy saving service area can then be transferred to the compensation communication station now providing the expanded compensation service area.

In typical implementations, the transition service area is a relatively larger geographic service area providing wireless service to UE devices where the service area includes adequate capacity to handle the UE devices transferred from the energy saving service areas. For example, the transition service area may be provided by a macrocell eNB having a service area at least partially covering the energy saving service. In another example, a compensation eNB may provide multiple service areas where one service area overlaps with the energy saving service area. For such an arrangement, the compensation eNB may include multiple radio heads where at least one radio head operates wireless signals within the transition service area at frequencies different from the frequencies used by the energy saving service area and the compensation service area. A transfer of UE devices from the transition service area to the compensation service area, in this case, includes assigning an uplink/downlink frequency pair used in the compensation service area and may involve transferring the UE device from the radio head providing the transition service area to the radio head providing the compensation service area. A single frequency may be assigned for the uplink and downlink where TDD is employed.

Figure 1A:
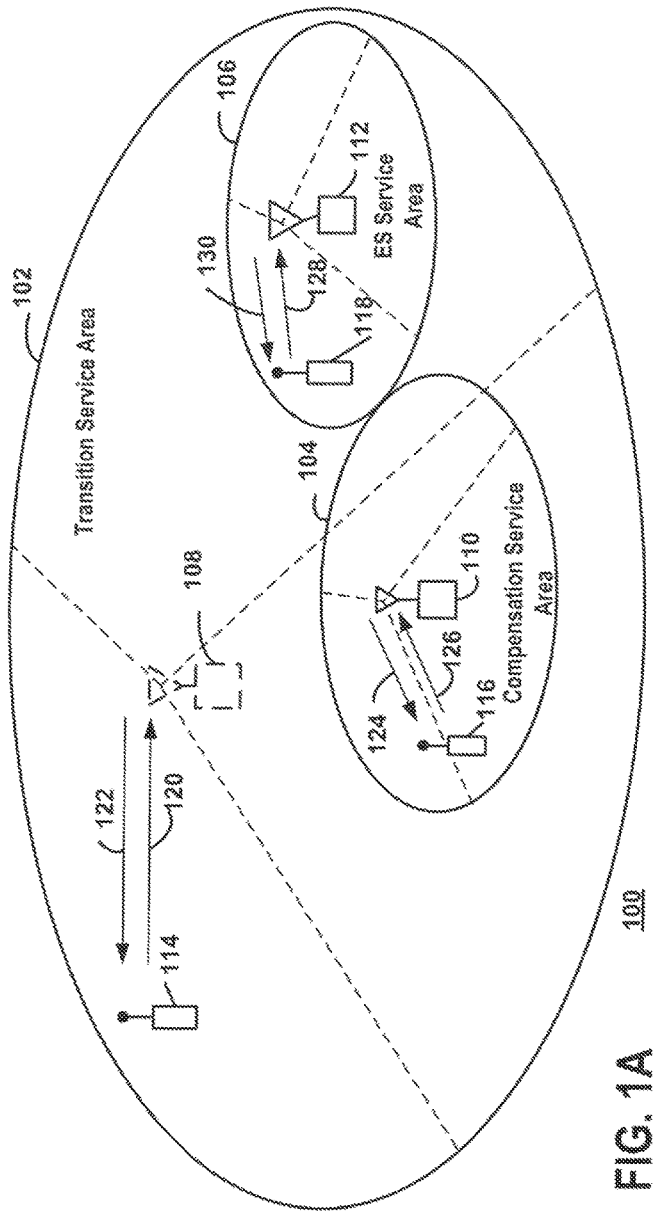
FIG. 1A is an illustration of geographical service areas in a cellular communication system where coverage area transitions are managed using a transition geographical service area (transition service area).

FIG. 1A is an illustration of geographical service areas in a cellular communication system 100 where coverage area configuration transitions are managed using a transition geographical service area (transition service area) 102. Communication stations provide wireless service within a geographical service areas represented by circular areas. In typical implementations of the cellular communication system 100, several adjacent transition service areas may cover large areas where each transition service area includes several smaller service areas positioned adjacent to each other within the transition service area 102. In the interest of brevity and clarity, however, FIG. 1A shows only two smaller cells 104, 106 within a single transition service area 102. The circular shapes representing the service areas generally illustrate the relationships between the areas and do not necessarily depict the actual shapes of the service areas. The coverage area transition management techniques discussed with reference to FIG. 1A may be applied to numerous coverage area transition scenarios. For example, several communication stations can be configured to deactivate several energy saving service areas and a compensation communication station can be configured to expand the compensation service area to cover the ES geographical service areas in accordance with the techniques discussed herein. The cells may have any of several shapes and sizes.

As noted above, a transition service area 102 may be formed by any communication station providing a service area that has adequate resources to handle UE devices transferred from the energy saving service area of an energy saving communication station. Although the transition service area may be a service area dedicated only for managing coverage area transitions, most implementations include using a service area providing communication service to UE devices and that has adequate capacity facilitate the dynamic coverage area transition.

For the example of FIG. 1A, the transition service area 102 covers a compensation geographical service area (compensation service area) 104 and an energy saving geographical service area (ES service area) 106. In some situations, the transition service area 102 may not cover all of the compensation service area 104 and/or the ES service area 106. For the example, a transition communication station 108 provides wireless service in the transition service area 102, a compensation communication station 110 provides wireless service in the compensation service area 104 and an energy saving communication station (ES communication station) 112 provides wireless service within the ES service area 106. Each communication station 108, 110, 112, which also may be referred to as an access node, access point, eNodeB, eNB, base station, and other terms, includes a transceiver and station controller. The transceiver, or radio head, is typically collocated with the station controller although, in some situations, the station controller may be physically separated from the radio head. The radio head at least includes radio frequency (RF) transceiver equipment such as antennas, transmitters, and receivers, for transmitting and receiving wireless signals. Typically, radio heads do not include higher level processing and control functions which are performed by the associated station controller. Depending on the particular implementation, the communication stations of FIG. 1A may be a standalone communication station with a dedicated station controller or may be formed with a radio head and a station controller connected to one or more other radio heads. In one example, the compensation communication station 110 is also the transition communication station 108 where the compensation communication station 108 provides the transition service area 102 using one set of frequencies and provides the compensation service area 104 using another set of frequencies. Therefore, the transition communication station 108 is illustrated with dashed lines in FIG. 1A to indicate that, in some situations, the transition communication station 108 may be part of the compensation communication station 110. As discussed below with reference to FIG. 1B, a single station controller can be connected to two radio heads to form the transition communication station 108 and the compensation communication station 110.

As discussed herein, a geographic service area (or service area) is a geographic region where a UE device can adequately communicate with a transceiver providing the wireless service within the geographic region. A geographic service area may use a singe uplink/downlink frequency pair or may use multiple frequency pairs or may use different time periods to distinguish uplink/downlink signals on the same frequency resource. For Frequency Division Duplex (FDD), a "cell" is often used to describe a geographic service area using a particular bandwidth (such as 5 MHz) within a single uplink/downlink frequency band pair. Accordingly, the geographic service regions, as discussed herein, may include one cell where only a single frequency pair is used or may include multiple cells where multiple frequency pairs are used. Each geographic service area may be provided by one or more radio heads where multiple radio heads may be connected to a single station controller. In some situations, for example, each radio head provides service using a single frequency pair resulting in multiple radio has providing service within the geographic service area where multiple frequency pairs are used within the service area. For Time Division Duplex (TDD), a cell can be described as a geographic service area using a particular bandwidth within one frequency band and the uplink and downlink signals are assigned different time periods. For TDD systems, geographical service areas may include multiple cells. For the discussion herein, a communication station includes the equipment and code to provide a single service area. Therefore, a communication station can be configured to adjust the size and shape of its service area. This may include adjusting multiple cells or may include adjusting a single cell where a service area employs a single communication resource (e.g., a single uplink/downlink frequency carrier pair).

Since the location, shape, and size of the service is determined at least in part by wireless transmission and reception with the communication station, the service area's location is determined by the location and operation of the radio head. Each communication station 108, 110, 112 provides wireless communication services to wireless communication user equipment devices (UE devices) 114, 116, 118 within the corresponding geographical service area. Several communication stations are typically interconnected through a backhaul (not shown in FIG. 1A) and to a network controller (not shown in FIG. 1A) to provide several service areas to cover large areas. The backhaul may include any combination of wired, optical, an/or wireless communication channels. For the examples herein, the network controller includes the functionality of the Mobility Management Entity (MME) and the Packet Gateway (P-GW).

A cellular communication system is typically required to adhere to a communication standard or specification. The communication specification defines at least a data channel and a control channel for uplink and downlink transmissions and specifies at least some timing and frequency parameters for physical downlink control channels from a base station to a wireless communication device. The Third-Generation Partnership Project Long-Term Evolution (3GPP LTE) communication specification is a specification for systems where communication stations (eNodeBs) provide service to wireless communication devices (UE devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification.

Therefore, for the examples herein, the coverage communication station 108 includes a wireless transceiver that transmits downlink signals 122 to one or more UE devices 114 within the transition service area 102 in accordance with 3GPP LTE and receives uplink signals 120 from one or more UE devices 114 within the transition service area 102 in accordance with 3GPP LTE. The compensation communication station 110 includes a wireless transceiver that transmits downlink signals 124 to one or more UE devices 116 within the compensation service area 104 in accordance with 3GPP LTE and receives uplink signals 126 from one or more UE devices 116 within the compensation service area 104. The energy saving communication station 112 includes a wireless transceiver that transmits downlink signals 130 to one or more UE devices 118 within the energy saving service area 106 in accordance with 3GPP LTE and receives uplink signals 128 from one or more UE devices 118 within the energy saving service area 106 in accordance with 3GPP LTE.

The UE devices 114, 116, 118 may be referred to as mobile devices, wireless devices, wireless communication devices, and mobile wireless devices, and UEs, as well as by other terms. The wireless communication devices include electronics and code for communicating with communication stations (eNBs) and, in some cases, with other devices including other UE devices. The UE devices include devices such as cell phones, smart phones, personal digital assistants (PDAs), wireless modem cards, wireless modems, televisions with wireless communication electronics, and laptop and desktop computers, as well as other devices. The combination of wireless communication electronics with an electronic device, therefore, may form a wireless communication device. For example, a wireless communication device may include a wireless modem connected to an appliance, computer, or television.

Although the compensation service area may slightly overlap the energy saving service area, the two areas in FIG. 1A use the same frequencies and, therefore, interference may occur where there is significant overlap of the geographic service areas. A different frequency from the frequencies used by the two smaller areas, however, is used to provide service within the transition service area 102. As a result, communication within the transition service area does not interfere with communication within the compensation service area or the energy saving service area.

Figure 1B:
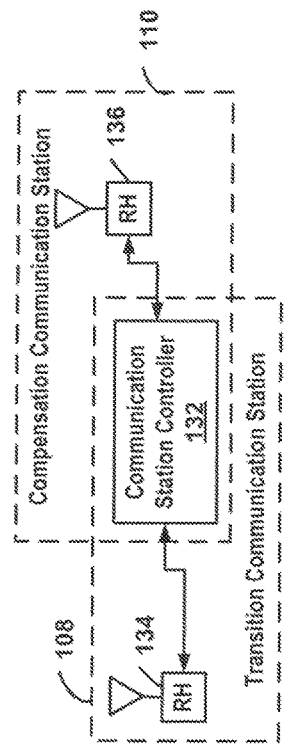
FIG. 1B is a block diagram of an example where the compensation communication station and the transition communication station are formed by two radio heads connected to a single station controller.

FIG. 1B is a block diagram of an example where the compensation communication station 110 and the transition communication station 108 are formed by two radio heads 134, 136 connected to the a single station controller 132. The station controller 132 establishes the transition service area 102 by transmitting and receiving signals though the radio head 134 and establishes the compensation service area 104 by transmitting and receiving signals through the radio head 136.

Figure 1C:
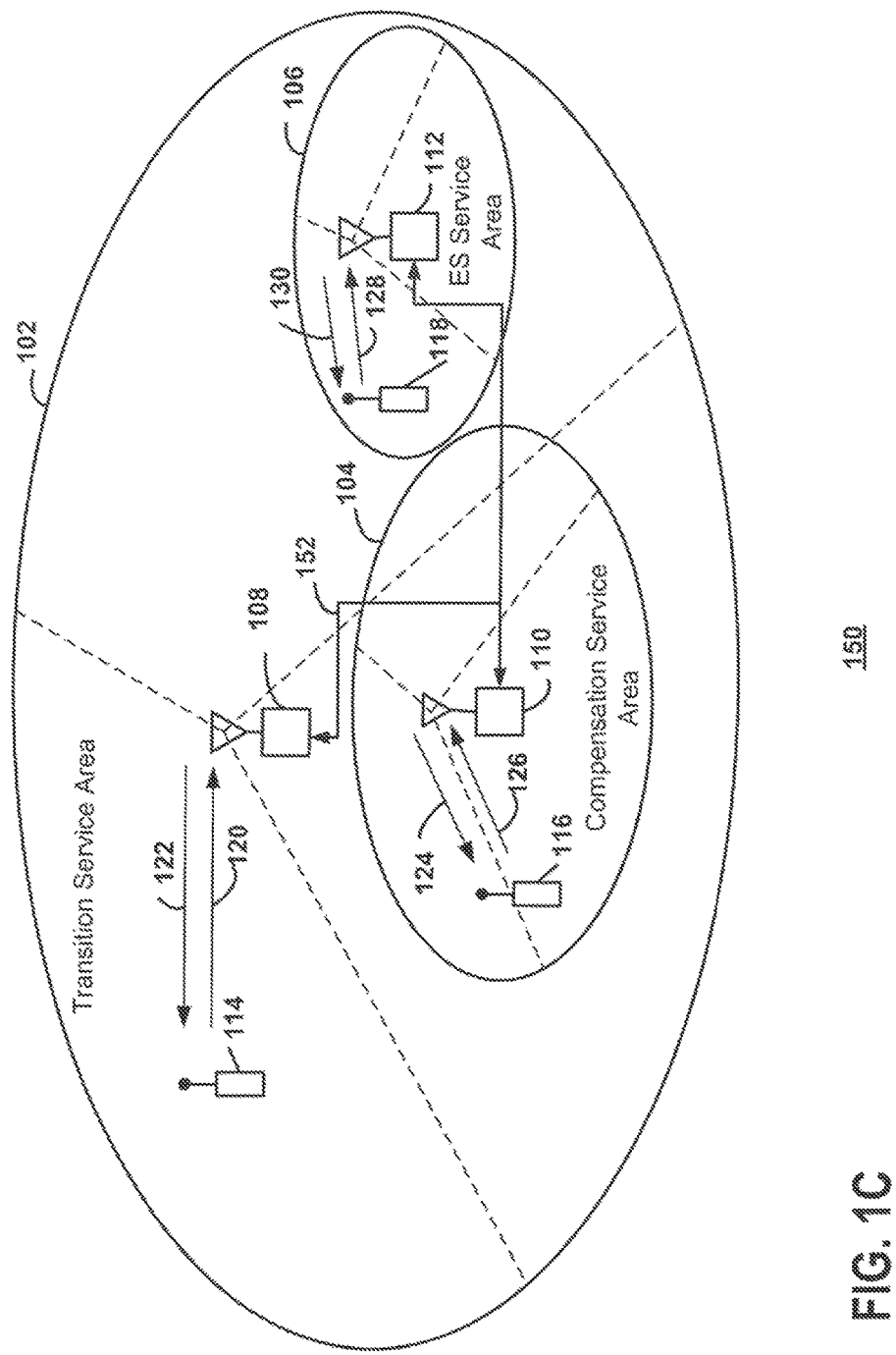
FIG. 1C is an illustration of geographical service areas in a cellular communication system where the transition communication station, the compensation communication station, and the energy saving communication station are connected through a backhaul.

FIG. 1C is an illustration of geographical service areas in a cellular communication system 150 where the transition communication station 108 is connected to the compensation communication station 110 through a backhaul 152. Therefore, for the example of FIG. 1C, the transition communication station 108 is a separate and distinct device from the compensation communication station 110. Such an arrangement may occur, for example, where the transition communication station 108 is a macrocell base station providing a relatively larger service area and the compensation communication station, such as a microcell base station or picocell base providing a relatively smaller service area. In some situations, the various sized service areas may be implemented with arrangements similar to the example of FIG. 1B. When the communication station providing the larger service has adequate capacity, the communication station may be used for transition area management and the larger service area may be used as the transition service area.

Figure 2:
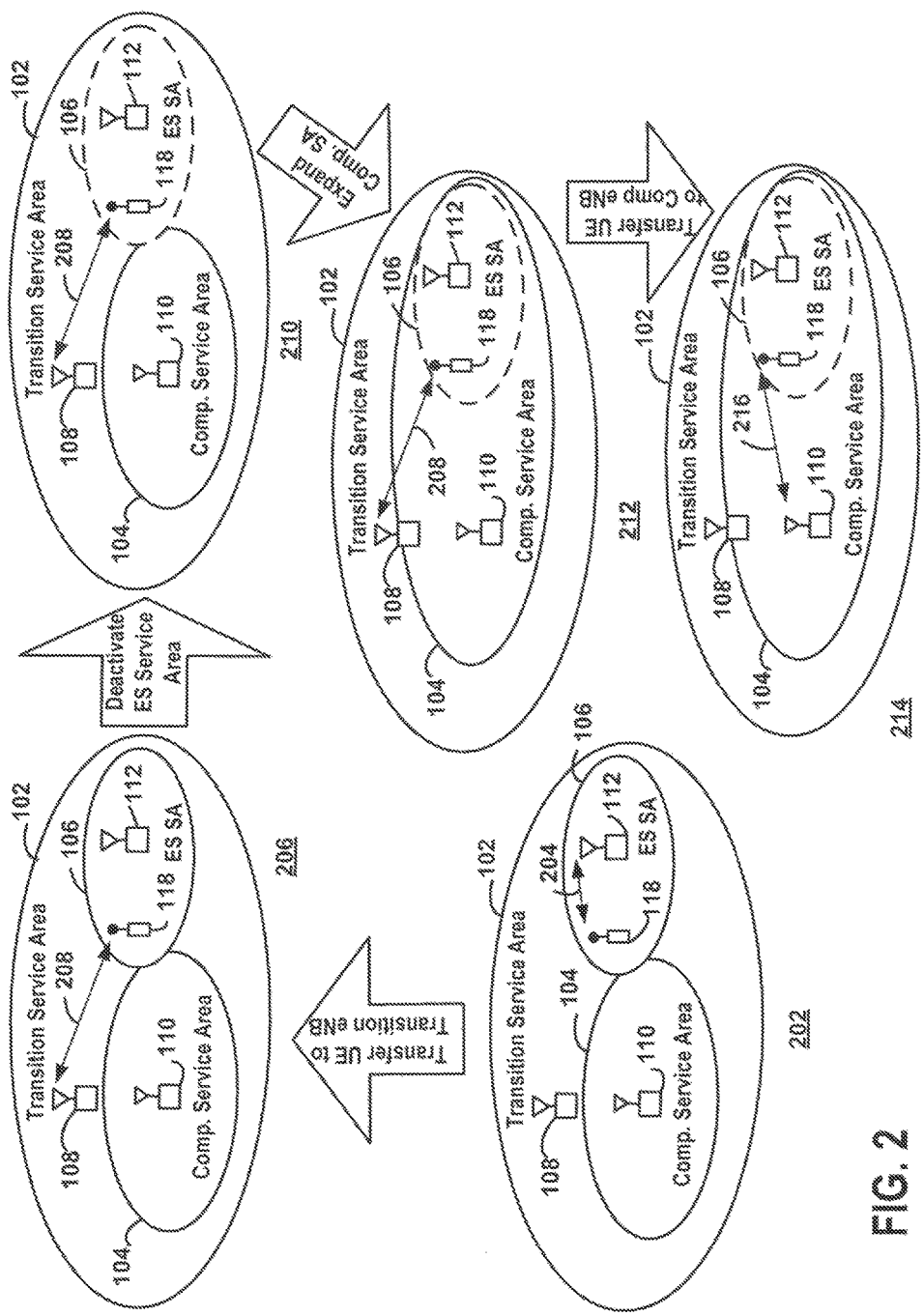
FIG. 2 is an illustration of a coverage area configuration transition where the energy saving service area is deactivated and the compensation service area is expanded to provide wireless service within the geographical region of the energy saving service area.

FIG. 2 is an illustration of a coverage transition where the energy service area 106 is deactivated and the compensation service area 104 is expanded to provide wireless service within the geographical region of the energy saving service area 106. In the example of FIG. 2, a coverage area configuration transition within the system of FIG. 1C is shown progressing through five stages. In the interest of clarity and brevity, a single UE device 118 is shown in the example.

In the first stage 202, the UE device 118 is communicating over wireless communication link 204 with the communication station 112 of the energy saving service area 106. For the example, the UE device 118 is at least receiving control signals and may also be transmitting control signals and exchanging data with the communication station 112 prior to the coverage transition. The coverage transition may be initiated in response to a determination that the energy saving service area 106 should be deactivated and the compensation service area 104 should be expanded. Such a determination may be based on any of several factors and circumstances where some examples include the resource load on the energy saving service area, the compensation service area, and the coverage service area. The resource load of a service area is based on the amount of time and frequency resources being used by all of the UE devices within the service area. The determination for deactivating the energy saving service area may be based on whether the compensation service area has the resource capacity available to provide service to the UE devices within the ES service area and whether the transition communication station 108 has the resource capacity available to temporarily provide service to the UE devices within the energy saving service area 106. As another example, the determination for deactivating an energy saving service area may be based on a particular time day, month, etc., where an operator has determined that the traffic load at this time can be managed without the energy saving service area. In response to the determination that the energy saving service area should be deactivated, the coverage area configuration transition is initiated.

At the second stage 206, the UE device 118 is transferred to the transition service area 102. For the example, the transfer is a handover procedure in accordance with an LTE communication specification. The transfer may also be referred to as a handoff in some circumstances. The transfer results in changing the serving cell of the UE device 118 from the energy saving service area 106 to the transition service area 102. A wireless communication link 208, therefore, is established between UE device 118 and the communication station 108 where control signals and data signals can be exchanged between the transition communication station 108 and the UE device 118.

The third stage 210 of the transition procedure is initiated after all of the UE devices within the energy saving geographical service area are transferred to other services areas. At this stage, the energy saving service area 106 is deactivated. The circle representing the energy saving service area 106 is shown with a dashed line to indicate that the service area is no longer active. As a result, the energy saving communication station (eNB) 112 does not provide wireless service within the energy saving service area by transmitting or receiving wireless signals. For the example herein, the energy saving communication station 112 is turned off and consumes little or no power.

The fourth stage 212 of the transition procedure is initiated after all of the UE devices within the energy saving geographical service area are transferred to other service areas and the energy saving service area has been deactivated. At this stage, the compensation service area 104 is expanded until it covers at least a portion of the geographical area previously serviced by the energy saving service area 106. In the example of FIG. 2, the compensation service area 104 is expanded to cover the entire geographical area previously serviced by the energy saving service area 106. The service area 104 may be expanded using any combination of known techniques such increasing transmission power, antenna tilting, and using antenna beam forming techniques. The transition communication station 108 continues to serve the UE device 118 within the transition service area 102 as the compensation service area is expanded.

The fifth stage 214 of the transition procedure is initiated after the compensation service area expansion is complete. At this stage, the UE device 118 is transferred to compensation communication station 110. For the example, the transfer is a handover procedure in accordance with the LTE communication specification. The transfer may also be referred to as a handoff in some circumstances. The transfer results in changing the serving service area of the UE device 118 from the transition service area 102 to the compensation service area 104. A wireless communication link 216, therefore, is established between UE device 118 and the compensation communication station 110 where control signals and data signals can be exchanged between the communication station 110 and the UE device 118.

Figure 3:
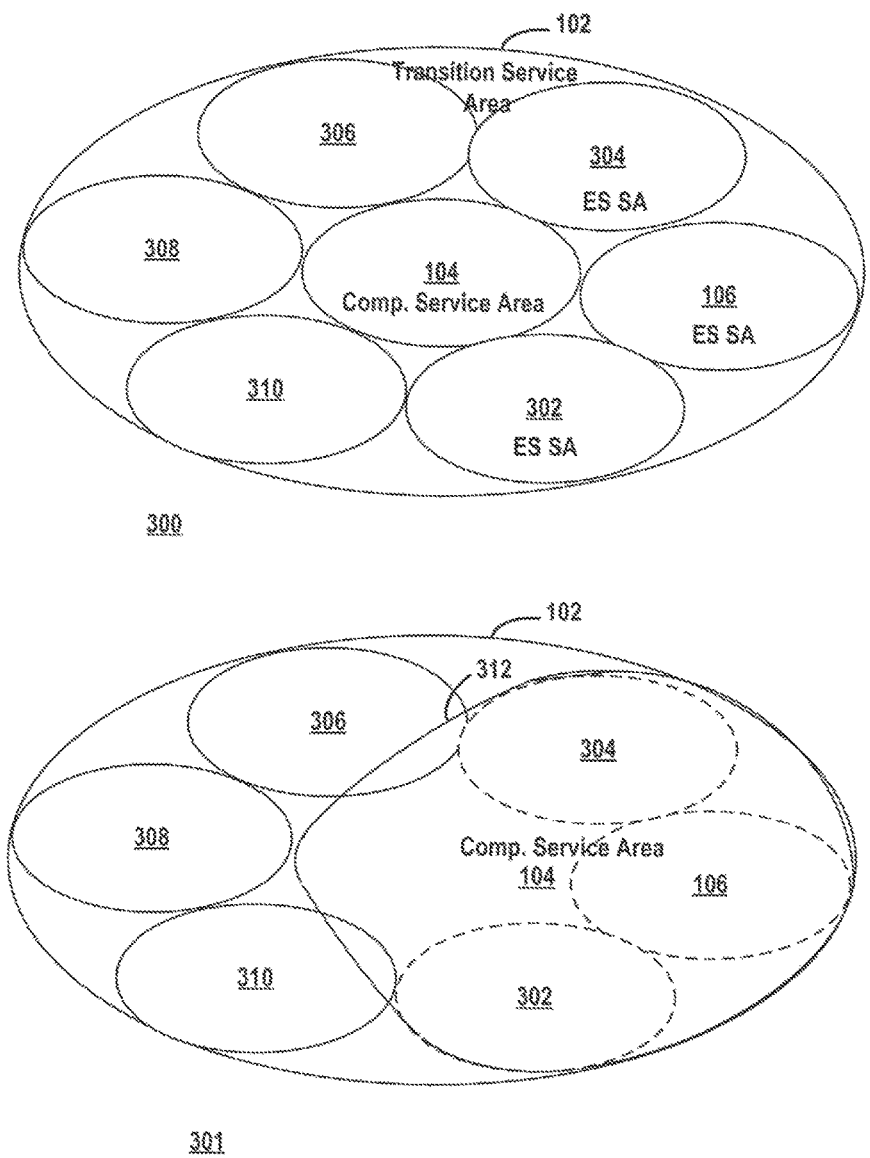
FIG. 3 includes illustrations of a coverage area transition where the transition service area covers a plurality of smaller service areas and the compensation service area is expanded to cover more than one energy saving service area.

FIG. 3 includes illustrations 300, 301 of a coverage area transition where the transition service area covers a plurality of smaller service areas and the compensation service area is expanded to cover more than one energy saving service area. The circular shapes representing the service areas generally illustrate the relationships between the service areas and do not necessarily depict the actual shapes of the service areas. In addition, the service areas may overlap in some regions more than in other regions. The open areas shown between the circular shaped service areas in the figure do not necessarily indicate that no service is available in these areas and are merely a product of illustration utilizing simple shapes to represent a more complicated relationship between service areas. Further, the service areas may contain holes of coverage where service is unavailable. In the interests of clarity and brevity, such features are not illustrated in the figures.

For the example of FIG. 3, the transition service area 102 covers the geographical areas of several smaller service areas 104, 106, 302, 304, 306, 308, 310 including the compensation service area 104 and three energy saving service areas 106, 302, 304. In the transition state 300 before the compensation area is expanded, the energy saving service areas 106, 302, 304 have coverage areas adjacent to the compensation service area 104. In the transition state 301 after the compensation service area is expanded, the compensation service area 104 has a coverage area that includes the original coverage area of the compensation service area 104 and at least portions of the coverage areas of the energy saving service areas 106, 302, 304. For the example, the expanded compensation service area 312 covers the areas previously covered by the energy saving service areas 106, 302, 304. The expanded compensation service area 312, therefore, is the compensation service area 104 with a larger coverage area. The energy saving service areas are shown with dashed lines in the coverage state 301 to illustrate that the service areas have been deactivated. The coverage area transition procedure for multiple energy saving service areas is similar to the transition procedure for a single energy saving service area discussed above. In one example, the compensation service area expands to cover each energy saving service area serially. In other words, the compensation service area is expanded to cover a first energy saving service area before a second energy service area. In such an example, all UE devices in the first energy saving service area are transferred to the transition service area, the compensation service area is expanded to cover the first energy saving service area, and the UE devices are transferred to the compensation service area prior to the procedure being performed for next energy saving service area. In the examples discussed below, however, the compensation service area is expanded to cover multiple energy saving service area areas in a single coverage area transition procedure. In this example, all UE devices from all energy saving service areas are transferred to the transition service area, the compensation service area is expanded, and all the UE devices are transferred to the compensation service area. In some circumstances, some UE devices may be transferred to neighboring small service areas (306, 310) instead of the transition service area.

Figure 4:
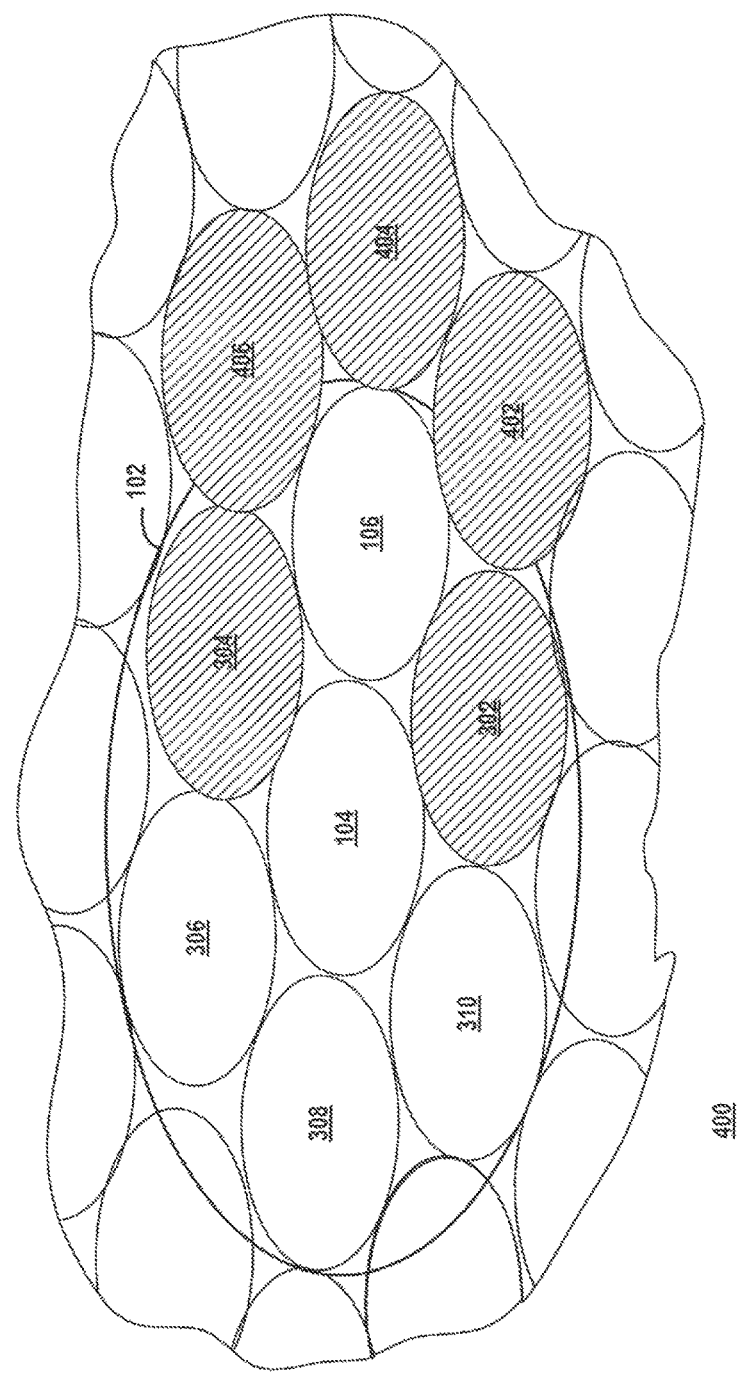
FIG. 4 is an illustration of the transition, compensation, and energy saving service areas with neighbor service areas.

FIG. 4 is an illustration of the service areas 102, 104, 106 with neighbor service areas. The example of FIG. 4 includes only a single energy service area 106. In the interest of clarity and brevity, FIG. 1, FIG. 2 and FIG. 3 illustrate only a limited number of service areas. In typical implementations, numerous service areas cover large geographic regions. A typical system includes multiple transition service areas as well as numerous smaller service areas. FIG. 4 shows a section of geographical region where several service areas provide ubiquitous coverage. The circular shapes representing the service areas generally illustrate the relationships between the service areas and do not necessarily depict the actual shapes of the service areas. In addition, the service areas may overlap in some regions more than in other regions. The open areas shown between the circular shaped service areas in the figure do not necessarily indicate that no service is available in these areas and are merely a product of illustration utilizing simple shapes to represent a more complicated relationship between service areas. Further, the service areas may contain holes of coverage where service is unavailable. In the interests of clarity and brevity, such features are not illustrated in the figures.

Each service area includes neighbor service areas that are adjacent service areas or otherwise near the service area. Service areas 104, 302, 304, 402, 404, 406 are neighbor service areas of the energy saving service area 106. Since the compensation service area is the expanding service area it is not consider a neighbor service area for the particular coverage area transition. As a result, the neighbor service areas for the example discussed herein are shown with crosshatched shading in FIG. 4. During the coverage area transition, the UE devices within the energy saving service area(s) may be transferred to a neighbor service area instead of the transition service area. For example a UE device receiving service from the energy saving service area 106 but positioned sufficiently close to the neighbor service area 404, may be transferred to the neighbor service area 404 during the coverage area transition.

As discussed below, neighbor service areas are notified of the change in coverage areas after the coverage area transition. Therefore, all neighbor service areas are informed of the expansion of the compensation service area and the deactivation of the energy saving service area when the transition is complete.

Figure 5:
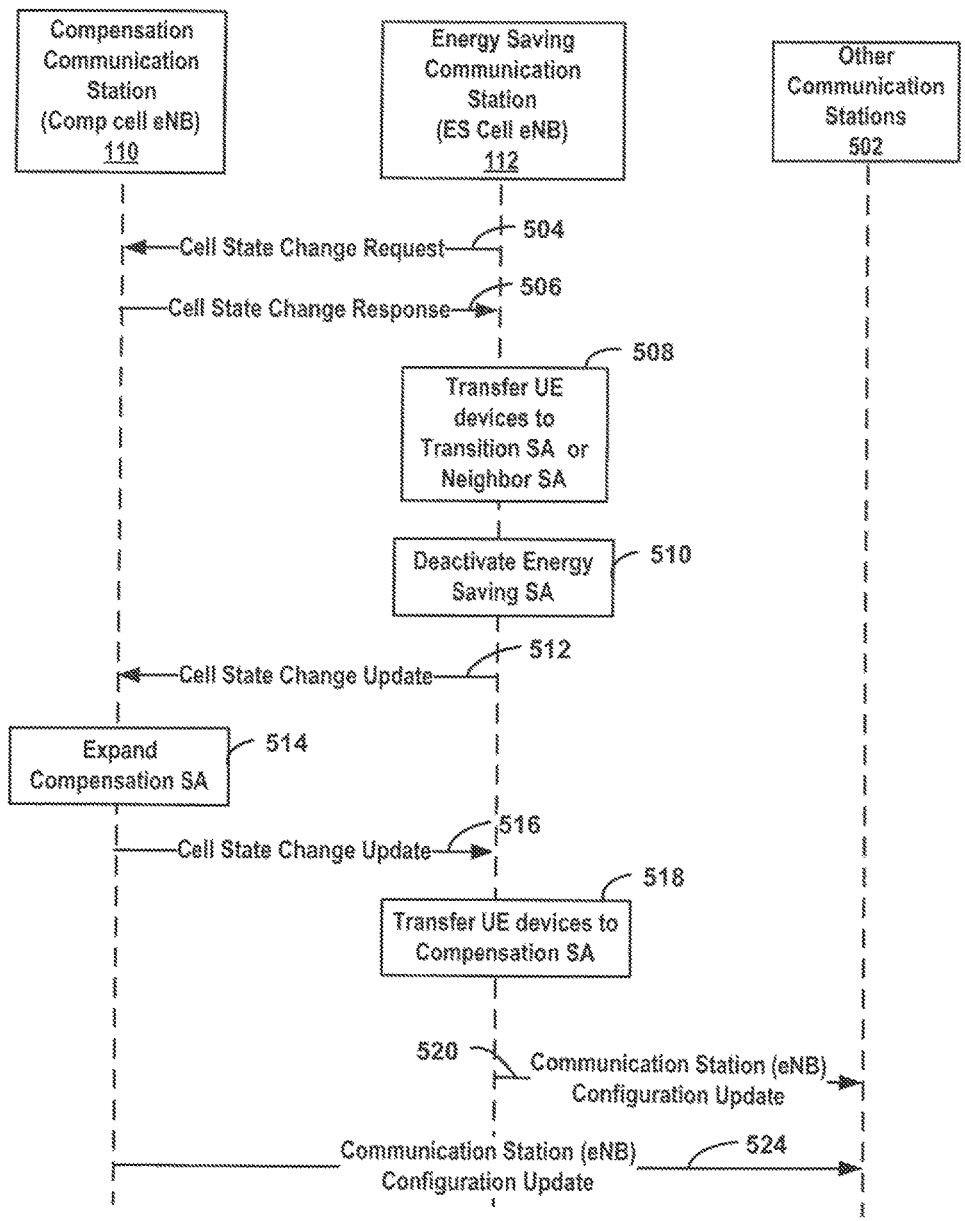
FIG. 5 is a message flow diagram between the compensation communication station, the energy saving communication station and other communication stations.

FIG. 5 is a message flow diagram 500 between the compensation communication station 110, the energy saving communication station 112 and other communication stations 502. The other communication stations 502 include at least the neighbor communication stations providing service within the neighbor service areas of the energy saving service area 106. The other communication stations 502 are communication stations that need to have information regarding the status of the compensation service area and the energy saving service area. The communication stations are connected through a backhaul that is typically wired but may include at least portions that are wireless communication links. For the example, the communication stations are eNBs that communicate through the backhaul over an X2 link in accordance with LTE communication standards. Other communication techniques can be used in some circumstances.

For the example shown in FIG. 5, in response to determining that the energy service area should be deactivated, the energy saving communication station (ES eNB) 112 sends a Cell State Change Request message 504 to the compensation communication station (compensation cell eNB) 110. The Cell State Change Request message 504 at least indicates to the compensation communication station 110 that the energy saving communication station is requesting change in its status from active to inactive. Unless provided by another procedure, this message may also include the energy saving service area's current load information, which the compensation service area may use to determine if it has the capacity available to provide service to the UE devices within the energy saving service area. In one example, the Cell State Change Request is part of a dedicated procedure for this feature that is added to a standard specification. In other circumstances, the Cell State Change Request message 504 function may be incorporated into messaging structures and procedures currently defined by a communication standard, such as the Load Management or eNB Configuration Update procedures contained in the LTE communication standard. In either case, modifications of the LTE communication standard can facilitate the procedure.

In response to the Cell State Change Request message 504, the compensation communication station 110 determines whether it can expand service to the energy saving service area. If it cannot, the compensation communication station 110 responds with a Cell State Change Response message 506 indicating that the compensation service area will not be expanded. Otherwise, as in the example of FIG. 5, the compensation communication station 110 responds with a Cell State Change Response message 506 indicating that the compensation service area will be expanded. In one example, the Cell State Change Response is part of a dedicated procedure for this feature that is added to a standard specification. In other circumstances, the Cell State Change Response message 506 function may be incorporated into messaging structures and procedures currently defined by a communication standard, such as the Load Management or eNB Configuration Update procedures contained in the LTE communication standard. In either case, modifications of the LTE communication standard can facilitate the communication.

After receiving the confirmation that the compensation service area will be expanded, the energy saving communication station 110 transfers all the UE devices it is serving to the transition service area or a neighboring service area at event 508. For the examples herein, a handover procedure in accordance with the LTE communication specification is used to transfer the UE devices.

When all the UE devices have been transferred from the energy saving service area, the energy saving service area is deactivated at event 510. As discussed herein, a service area is "deactivated" when it no longer transmits downlink signals to UE devices and does not receive or process uplink signals from UE devices. Therefore, a deactivated service area cannot provide wireless service to UE devices. The communication station that provides the energy serving service area still includes active functions and is not turned off. For example, the communication station is still capable of communicating with other communication stations and/or the network.

After the energy saving service area is deactivated, the energy saving communication station sends a Cell Status Change Update message 512 indicating that the service area has been deactivated and that the compensation service area can be expanded. In one example, the Cell State Change Update message 512 is part of a dedicated procedure for this feature that is added to a standard specification. In other circumstances, the Cell State Change Response message 512 function may be incorporated into messaging structures and procedures currently defined by a communication standard, such as the Load Management or eNB Configuration Update procedures contained in the LTE communication standard. In either case, modifications of the LTE communication standard can facilitate the communication.

At event 514, the compensation service area is expanded in response to receiving the Cell Status Change Update message 512. The compensation communication station increases transmission power and performs other known techniques for expanding the compensation service area to cover at least a portion of the energy saving service area service area. For example, techniques such as antenna tilting and antenna beam forming may be used to provide an expanded service area of the compensation communication station that covers the original service area of the energy saving service area as well as the original service area of the compensation service area. Where multiple energy saving service areas are deactivated the compensation service area is expanded to cover those service areas. In one example, the parameters for establishing the expanded coverage area are determined at the time of equipment deployment. For example, signal quality measurements may be made and the parameters may be determined using the signal measurements at the time of or after equipment installation. Accordingly, the compensation communication station applies stored values or values it has received from an Operations and Maintenance (OAM) system to expand the service area to cover the areas of the energy saving service areas that have been deactivated. This example showing explicit signaling messages is only for illustration and other means can be used to trigger the state changes for this procedure. For example, OAM system may provide signals for this purpose, or may provide values for the time duration of each state in the procedure. For example, OAM could provide the compensation communication station the time duration before it should begin the expansion of the compensation service area. This time duration could be based on the expected amount of time required for the energy saving service area UE devices to be handed over to a transition service area.

In another example, the extent of the expansion of the compensation service area is based on feedback provided by UE devices. The transition service area communication station may request that UE devices report signal strength measurement information about the transition service area in relation to the compensation service area. For example, in the case where the expanded compensation service area covers the same area as the transition service area, the compensation service area coverage should be the same as the transition service area coverage. The transition communication station can request UE devices to measure the signal strength of both the transition service area transmitter and the compensation service area transmitter. The transition communication station can compare the two signal strength measurements and notify the compensation communication station if the difference between the measurements is greater than a predetermined threshold. The compensation communication station can expand or reduce the compensation service area based on the difference between the measurements. If the measurements made by the UE devices are the same within a certain threshold, it is likely that the coverage for the two service areas is close to the same, including at the edge of the service area even if there is no UE device located there to report measurements. Similarly, for cases where the service areas are not the same, the relationship between their signal strengths can be determined beforehand, such as during deployment, and can be used to assist to determine when the compensation service area has been expanded to the proper extent. In addition, communication stations with neighboring service areas can also use measurements from their UE devices to assist with this process.

After the compensation service area has been expanded, the compensation communication station sends a Cell State Change Update message 516 indicating that the service area is expanded.

At event 518, the UE devices previously receiving service from the energy saving service area(s) are transferred to the compensation service area. In some situations, one or more of the UE devices may be transferred to other services areas or may remain with the transition service area. For the example, handover procedures in accordance with LTE specification are invoked to transfer the UE devices from the transition service area or the neighbor service area to the compensation communication station that now is providing an expanded service area covering the original service areas of the energy saving service area(s). The conventional handover triggering conditions in effect in the system may be used. Since the compensation service area is closer to these UE devices than the transition service area, many of the UE devices previously served by the energy saving service area will be handed over to the compensation service area.

A communication station configuration update message 520 is sent from the energy saving communication station to the other communications stations indicating that the energy saving service area is no longer active. The other communication stations include at least the neighbor stations of the energy saving service area and may include other communication stations that require information regarding the status of the energy saving service area. For example, this functionality could be added to the LTE X2 interface eNB Configuration Update message that communication stations use to notify other communication stations about configuration changes of their service areas (cells).

A communication station configuration update message 522 is sent from the compensation communication station to the other communications stations indicating that the compensation service area has been expanded. The other communication stations include at least the neighbor stations of the energy saving service area and may include other communication stations that require information regarding the status of the compensation service area. For example, this functionality could be added to the LTE X2 interface eNB Configuration Update message that communication stations use to notify other communication stations about configuration changes of their service areas.

For the example above, the order of events may be modified in some circumstances. For example, the UE devices may be transferred to the compensation service area after the communication stations configuration messages 520, 522 are transmitted to the other communication stations 502.

FIG. 6A is an illustration of coverage areas in a cellular communication system 600 where coverage area transitions are managed using a transition cell 102 provided by a compensation communication station 108. The arrangement is similar to the example discussed above where the transition service area is provided by communication station separate from the compensation communication station. For the example of FIG. 6A, however, the transition service area is provided by the compensation communication station. The compensation communication station, therefore, provides wireless service within two geographical areas represented by two circular areas where one circular area is a compensation service area and the other, larger circular area is the transition service area. The transition service area 102 overlaps with the compensation service area 104 and an energy saving service area 106. In typical implementations of the cellular communication system 600, several adjacent transition service areas may cover large areas where each transition service area includes several smaller cells positioned adjacent to each other within the transition service area 102. In the interest of brevity and clarity, however, FIG. 6A shows only two smaller cells 104, 106 within a single transition service area 102. The circular shapes representing the service areas of the cells generally illustrate the relationships between the cells and do not necessarily depict the actual shapes of the service areas. The coverage area transition management techniques discussed with reference to FIG. 6A may be applied to numerous coverage area transition scenarios. For example, several energy saving service areas may be deactivated and a compensation service area may be expanded to cover the geographical service areas of the multiple energy saving service areas in accordance with the techniques discussed herein. The service areas may have any of several shapes and sizes.

Communication stations 108, 112 transmit and receive wireless signals to provide the cells 102, 104, 106. Each communication station 108, 112, which also may be referred to as an access node, access point, eNodeB, eNB, base station, and other terms, includes a transceiver and station controller. The transceiver, or radio head, is typically collocated with the station controller although, in some situations, the station controller may be physically separated from the radio head. The radio head at least includes radio frequency (RF) transceiver equipment such as antennas, transmitters, and receivers, for transmitting and receiving wireless signals. Typically, radio heads do not include higher level processing and control functions which are performed by the associated controller. The radio heads may be near a controller where both the radio head and the controller may be implemented within a single apparatus. Also, each communication station may include more than one radio head. As discussed below with reference to FIG. 6B, for example, a single station controller can be connected to a transition radio head and a compensation radio head. Since the location, shape, and size of the cell is determined at least in part by wireless transmission and reception with the communication station, the cell's location is determined by the location and operation of the radio head. The compensation communication station 108 provides the transition service area 102 and the compensation service area 104 and an energy saving communication station 112 provides the energy saving service area 106. Each communication station 108, 112, therefore, provides wireless communication services to wireless communication user equipment devices (UE devices) 114, 116, 118 within a geographical service area. Several communication stations are typically interconnected through a backhaul (not shown in FIG. 6A) and to a network controller (not shown in FIG. 6A) to provide several service areas to cover large areas. The backhaul may include any combination of wired, optical, and/or wireless communication channels. For the examples herein, the network controller includes the functionality of the Mobility Management Entity (MME) and the Packet Gateway (P-GW).

As discussed above, a cellular communication system is typically required to adhere to a communication standard or specification. The cellular communication system 600 for the examples of FIG. 6A and FIG. 6B operate in accordance with 3GPP LTE.

Therefore, for the examples herein, the compensation communication station 108 includes a wireless transceiver that transmits downlink signals 122 to one or more UE devices 114 within the transition service area 102 in accordance with 3GPP LTE and receives uplink signals 120 from one or more UE devices 114 within the transition service area 102 in accordance with 3GPP LTE. The compensation communication station 110 also transmits downlink signals 124 to one or more UE devices 116 within the compensation service area 104 in accordance with 3GPP LTE and receives uplink signals 126 from one or more UE devices 116 within the compensation service area 104. The energy saving communication station 112 includes a wireless transceiver that transmits downlink signals 130 to one or more UE devices 118 within the energy saving service area 106 in accordance with 3GPP LTE and receives uplink signals 128 from one or more UE devices 118 within the energy saving service area 106 in accordance with 3GPP LTE.

The compensation communication station 108 uses different frequencies to provide the compensation service area 104 and the transition service area 102. For the example of FIG. 6A, a first downlink/uplink frequency pair is assigned for the transition service area 102 and a second downlink/ uplink frequency pair is assigned for the compensation service area 104. Several downlink/uplink frequency pairs may be assigned to each service area 102, 104. The first downlink frequency is different from the second downlink frequency and the first uplink frequency is different from the second uplink frequency. The first downlink frequency and the first uplink frequency are not used by the energy saving communication station. Accordingly, communications in the transition service area do not interfere with communications in energy saving service areas 106 even though the cells overlap because different frequencies are used. Where more than one frequency pair is used by each service area, no frequency pairs used by the transition service area are used by any the energy saving service areas within the transition service area 102.

Figure 6B:
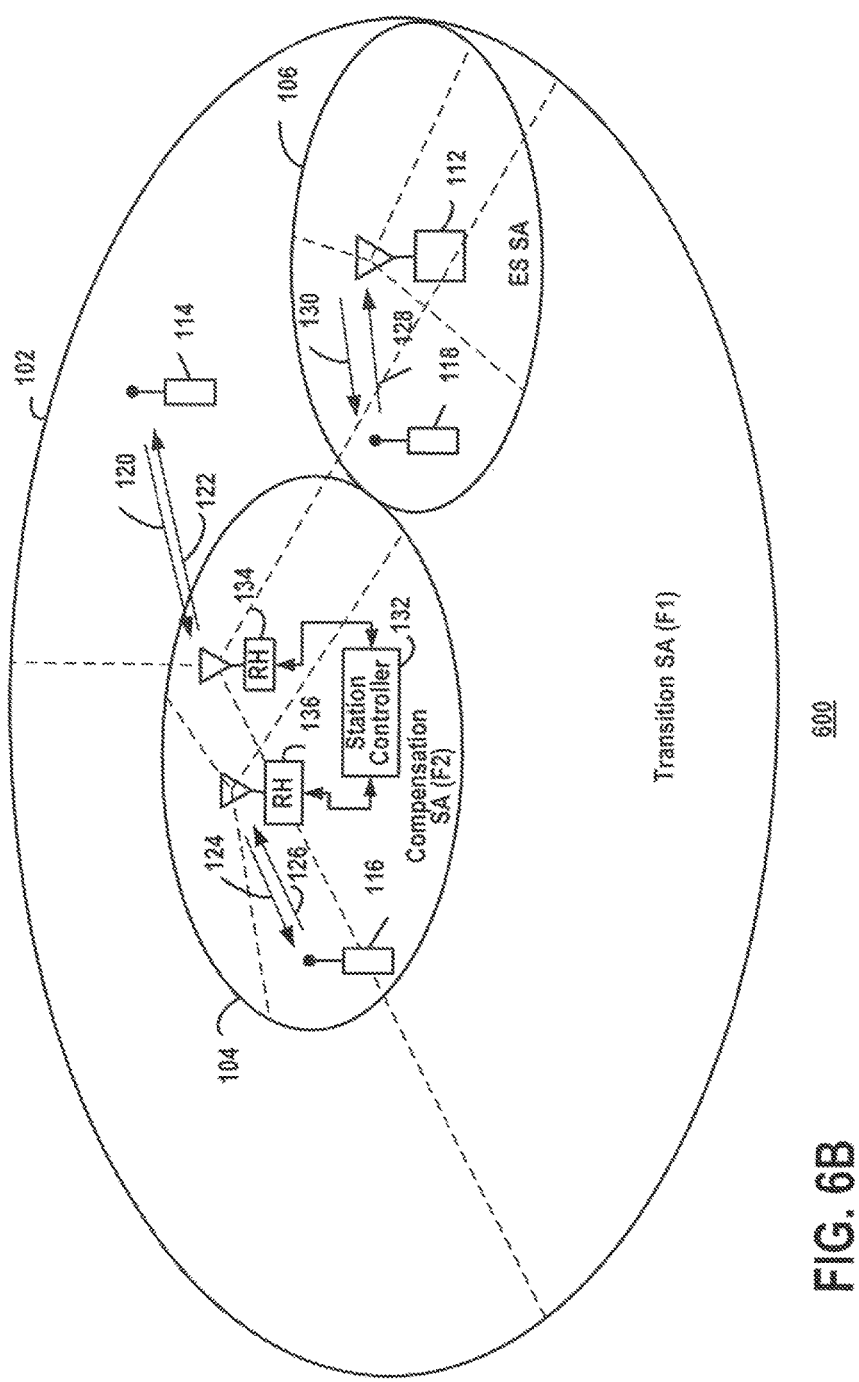
FIG. 6B is an illustration of the cellular communication system where the compensation station includes a station controller and two radio heads.

FIG. 6B is an illustration of the cellular communication system where the compensation station includes a station controller 132 and two radio heads 134, 136. As mentioned above, a communication station may include more than one radio head. For the example of FIG. 6B, the station controller 132 of the compensation communication station is connected to a transition radio head 134 and a compensation radio head 136. The transition radio head 134 exchanges wireless signals 120, 122 with UE devices 114 within the transition service area 102. The transition service area 102 may be a cell or other service area that continually provides wireless services to UE devices in accordance with known techniques. The transition service area may also facilitate management of dynamic coverage area transition when the transition service area includes adequate capacity. The compensation radio head 130 exchanges wireless signals 124, 126 with UE devices 116 within the compensation service area 104.

Figure 7:
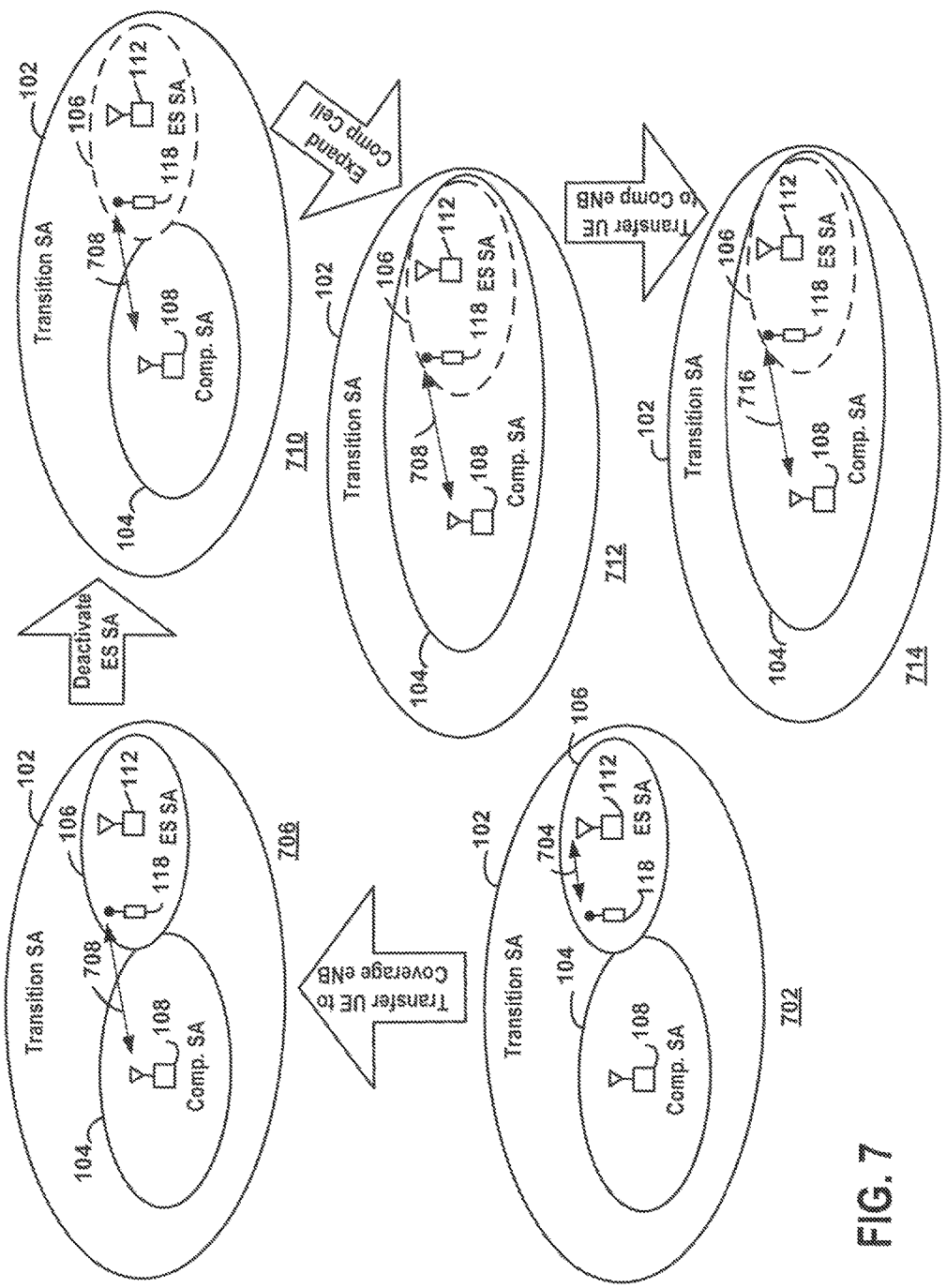
FIG. 7 is an illustration of a coverage area configuration transition where the energy saving service area 106 is deactivated and the compensation service area is expanded to provide wireless service within the geographical service area of the energy saving service area.

FIG. 7 is an illustration of a coverage area configuration transition where the energy saving service area 106 is deactivated and the compensation service area 104 is expanded to provide wireless service within the geographical service area of the energy saving service area 106. In the example of FIG. 7, a coverage transition within the system of FIG. 6A or FIG. 6B is shown progressing through five stages. In the interest of clarity and brevity, a single UE device 118 is shown in the example. Also, although not shown, the compensation communication station 108 may include more than one radio head.

In the first stage 702, the UE device 118 is communicating over wireless communication link 704 with the communication station 112 of the energy saving service area 106. For the example, the UE device 118 is at least receiving control signals and may also be transmitting control signals and exchanging data with the communication station 112 prior to the coverage transition. The coverage transition is initiated in response to a determination that the energy saving service area 106 should be deactivated and the compensation service area 104 should be expanded. Such a determination may be based on any of several factors and circumstances where some examples include the resource load on the energy saving service area, the compensation service area, and the coverage service area. The resource load of a service area is based on the amount of time and frequency resources being used by all of the UE devices within the service area. The determination for deactivating the energy saving service area may be based on whether the compensation service area has the resource capacity available to provide service to the UE devices within the ES service area and whether the transition communication station 108 has the resource capacity available to temporarily provide service to the UE devices within the energy saving service area 106. As another example, the determination for deactivating an energy saving service area may be based on a particular time day, month, etc., where an operator has determined that the traffic load at this time can be managed without the energy saving service area. In response to the determination that the energy saving service area should be deactivated, the coverage transition is initiated.

At the second stage 706, the UE device 118 is transferred to the transition service area 102. For the example, the transfer is a handover procedure in accordance with an LTE communication specification. The transfer may also be referred to as a handoff in some circumstances. The transfer results in changing the serving cell of the UE device 118 from the energy saving service area 106 to the transition service area 102. A wireless communication link 708, therefore, is established between UE device 118 and the communication station 108 where control signals and data signals can be exchanged between the coverage communication station 108 and the UE device 118. The frequencies used for the communication link 708 with the compensation communication station 108 are different from the frequencies used for the communication link 704.

The third stage 710 of the transition procedure is initiated after all of the UE devices within the energy saving service area 106 are transferred to other services areas. At this stage of the transition procedure, the energy saving service area 106 is deactivated. The circle representing the energy saving service area 106 is shown with a dashed line to indicate that the service area is no longer active. As a result, the energy saving communication station (eNB) 112 does not provide wireless service within the energy saving service area by transmitting or receiving wireless signals. For the example herein, the energy saving communication station 112 is turned off and consumes little or no power.

The fourth stage 712 of the transition procedure is initiated after all of the UE devices within the energy saving service area 106 are transferred to other service areas and the energy saving service area has been deactivated. At this stage, the compensation service area 104 is expanded until it covers at least a portion of the geographical area previously serviced by the energy saving service area 106. The cell 104 may be expanded using any combination of known techniques such as increasing transmission power, antenna tilting, and using antenna beam forming techniques. The compensation communication station 108 continues to serve the UE device 118 within the transition service area 102 using the communication link 708 as the compensation service area 104 is expanded.

The fifth stage 714 of the transition procedure is initiated after the compensation service area expansion is complete. At the fifth stage 714, the UE device 118 is transferred to the compensation service area. The communication resources using the frequencies assigned to the compensation service area 108 are scheduled to the UE device 118. For the example, the transfer is in accordance with the LTE communication specification and results in changing the serving cell of the UE device 118 from the transition service area 106 to the compensation service area 104. Where the compensation station includes a transition radio head and a compensation radio head, the UE device 118 is transferred from the transition radio head 134 to the compensation radio head 136 by scheduling the communication resources assigned to the compensation radio head. A wireless communication link 716, therefore, is established between UE device 118 and the compensation radio head 136 of the compensation communication station 108 where control signals and data signals can be exchanged between the compensation radio head 136 of the communication station 108 and the UE device 118. In situations, the fifth stage may not be performed. For example, the transition radio head 134 can continue to provide service to the UE device 118 until a transfer is warranted.

The dynamic coverage area transition procedure for examples where the compensation communication station 108 provides the transition service area 102 may be performed for multiple energy saving service areas. Arrangements such as those described with reference to FIG. 3, therefore, apply to the transition procedure where the transition service area 102 covers the geographical areas of several smaller service areas 104, 106, 302, 304, 306, 308, 310 including the compensation service area 104 and three energy saving service areas 106, 302, 304.

The messaging between the communication stations for the dynamic coverage area transition procedure for examples where the compensation communication station 108 provides the transition service area 102 is similar to the examples discussed with reference to FIG. 5. For arrangements where the compensation communication station 108 provides the transition service area 102, the Cell State Change Request message 504, Cell State Change Response message 506, Cell Status Change Update message 512, Cell State Change Update message 516, communication station configuration update message 520, and communication station configuration update message 522 are formatted and transmitted as discussed with reference to FIG. 5. For event 518, the communication station may perform UE device hangovers in an implementation-specific way since the target and source of the handovers are controlled by the same communication station and no signaling between communication stations is required.

For the example, handover procedures in accordance with LTE specification are invoked to transfer the UE devices from the transition service area or a neighbor cell to the compensation communication station that now is providing an expanded cell covering the original service areas of the energy saving service area(s).

Clearly, other embodiments and modifications of this invention will occur readily to those of ordinary skill in the art in view of these teachings. The above description is illustrative and not restrictive. This invention is to be limited only by the following claims, which include ail such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
   transferring a user equipment device (UE device) from an energy saving communication station to a transition radio head providing a transition service area that at least partially overlaps with an energy saving service area provided by the energy saving communication station, the transition radio head and the energy saving communication station operating in accordance with a same communication specification;
   contracting the energy saving service area;
   transmitting a cell state change update message from the energy saving communication station to a compensation communication station, the cell state change update message at least indicating that no UE devices are receiving wireless service from the energy saving communication station;
   expanding, at least partially in response to receiving the cell state change update message at the compensation communication station, a compensation service area of the compensation communication station to cover at least a portion of the energy saving service area of the energy saving communication station; and
   transferring the UE device from the transition radio head to a compensation radio head of the compensation communication station that provides the compensation service area.

2. The method of claim 1, wherein contracting the energy saving service area comprises deactivating the energy saving service area such that the energy saving communication station does not provide wireless communication services within the energy saving service area.

3. The method of claim 1, further comprising:
   transferring the UE device to the compensation communication station after the compensation service area is expanded.

4. The method of claim 1, wherein the transition radio head is located within a transition communication station.

5. The method of claim 4, wherein the transition communication station comprises a transition controller and the compensation communication station comprises a compensation station controller.

6. The method of claim 1, wherein the transition radio head is located within the compensation communication station and wherein the transferring of the UE device from the energy saving communication station comprises:
   assigning a first communication frequency pair to the UE device for communication with the transition radio head of the compensation communication station, the first communication frequency pair different from all communication frequency pairs used by the compensation radio head to provide the compensation service area.

7. The method of claim 1, wherein the transition radio head is located within a neighbor base station providing a neighbor service area partially overlapping the energy saving service coverage area.

8. The method of claim 1, wherein the transferring the UE device from the energy saving communication station comprises assigning an up ink/downlink frequency pair for communication between the UE device and the transition radio head, the uplink/downlink frequency pair not used by the energy saving communication station.

9. The method of claim 8, wherein the transferring the UE device from the energy saving communication station comprises performing a handover procedure from the energy saving communication station.

10. A cellular communication system comprising:
    an energy saving communication station providing an energy saving service area;
    a compensation communication station providing a compensation service area through a compensation radio head and connected to the energy saving communication station through a backhaul; and
    a transition radio head providing a transition service area that at least partially overlaps with the energy saving service area, the transition radio head and the energy saving communication station operating in accordance with a same communication specification,
    the system configured to:

transfer a user equipment device (UE device) from the energy saving communication station to the transition radio head;

deactivate the energy saving service area;

expand the compensation service area to cover at least a portion of the energy saving service aret at least partially in response to determining that no UE devices are receiving wireless service from the energy saving communication station; and transfer the UE device from the transition radio head to the compensation radio head of the compensation communication station.

11. The cellular communication system of claim 10, the system further configured to transfer the UE device from the transition radio head to the compensation communication station after the compensation service area is expanded.

12. The cellular communication system of claim 10, the system further configured to transfer the UE device from the energy saving communication station to the transition radio head by assigning an uplink/downlink frequency pair to the UE device for communication with the transition radio head, the uplink/downlink frequency pair not used by the energy saving communication station.

13. The cellular communication system of claim 12, wherein the transition radio head is connected to a transition station controller different from a compensation station controller of the compensation communication station.

14. The cellular communication system of claim 13, wherein the transferring the UE device from the energy saving communication station comprises performing a handover procedure from the energy saving communication station.

15. The cellular communication system of claim 12, wherein the transition radio head is connected to a station controller of the compensation communication station.

16. The cellular communication system of claim 10, wherein the system operates in accordance with a Third-Generation Partnership Project Long-Term Evolution (3GPP LTE) communication specification.

17. The cellular communication system of claim 16, wherein the energy saving communication station is configured to initiate transfer of all UE devices from the energy saving station to the transition radio head in response to receiving a cell state response message transmitted from the compensation communication station through the backhaul, the cell state response message indicating that the compensation service area will be expanded.

18. A method comprising:

transmitting a cell state change request message from an energy saving communication station to a compensation communication station, the cell state change request message at least requesting deactivation of an energy saving service area provided by the energy saving communication station;

transmitting a cell state change response message from the compensation communication station to the energy saving communication station, the cell state change response message indicating that the energy saving service area should be deactivated;

transferring a user equipment device (UE device from the energy saving communication station to a transition radio head, the transferring comprising assigning to the UE device an uplink/downlink frequency pair for communication with the transition radio head and not used by the energy saving communication station, the transition radio head and the energy saving communication station operating in accordance with a same communication specification;

deactivating the energy saving service area such that the energy saving communication station does not provide wireless service within the energy saving service area;

transmitting a cell state change update message from the energy saving communication station to the compensation communication station, the cell state change update message at least indicating that no UE devices are receiving wireless service from the energy saving communication station;

expanding, at least partially in response to receiving the cell state change update message at the compensation communication station, a compensation service area of the compensation communication station to cover at least a portion of the energy saving service area of the energy saving communication station; and transferring the UE device from the transition radio head to a compensation radio head of the compensation communication station that provides the compensation service area.

* * * * *